Figure 1:
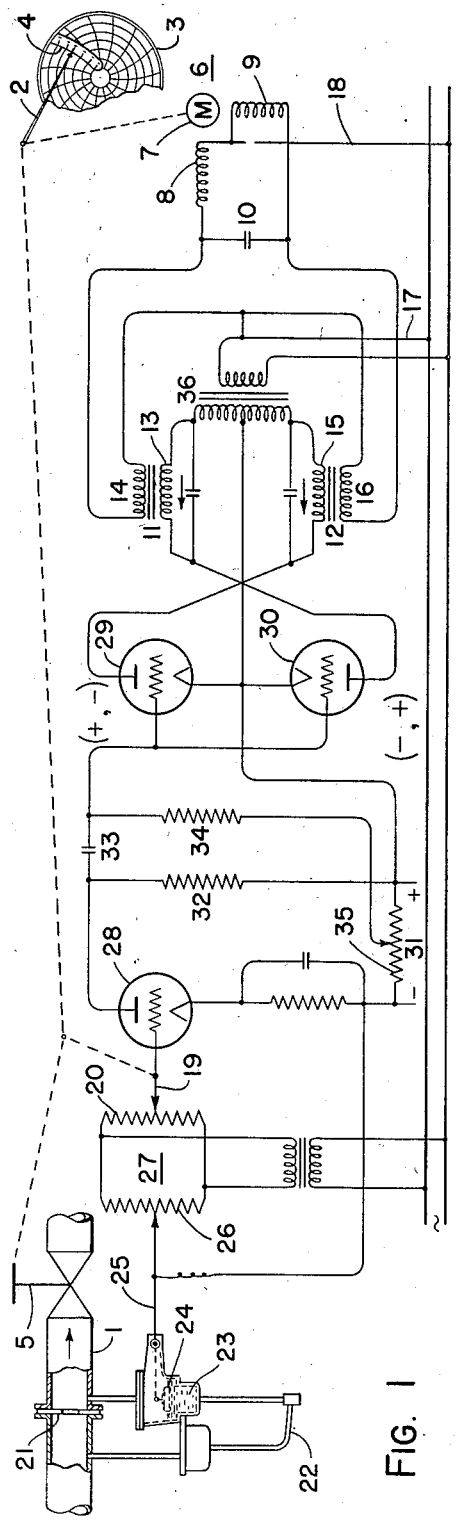

June 18, 1946.  J. D. RYDER ET AL  2,402,210

MEASURING AND CONTROL SYSTEM

Filed Aug. 3, 1942  2 Sheets-Sheet 1

Inventors
ANTHONY J. HORNFECK
AND
JOHN D. RYDER
By Raymond D. Junkins
Attorney

Inventors
ANTHONY J. HORNFECK
AND JOHN D. RYDER
By Raymond W. Jenkins
Attorney

Patented June 18, 1946

2,402,210

UNITED STATES PATENT OFFICE 2,402,210

MEASURING AND CONTROL SYSTEM

John D. Ryder, Ames, Iowa, and Anthony J. Hornfeck, Cleveland Heights, Ohio, assignors to Bailey Meter Company, a corporation of Delaware Application August 3, 1942, Serial No. 453,487

7 Claims. (Cl. 172—239)

This invention relates to a system for measuring and/or controlling the magnitude of a variable, such as temperature, pressure, rate of fluid flow, position, or displacement, although the variable may be of any chemical, physical, electrical, thermal, or other characteristic.

In accordance with our invention variations in a variable quantity, quality or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable.

In devices of the same general type at present known wherein variations in the variable are translated into variations in an electrical effect, the necessary amplification is done, at least in part, by mechanical means. There are, therefore, variations in magnitude of the variable translated into variations in an electrical effect, which is then translated into a corresponding mechanical movement, such as the deflection of a galvanometer, and thence usually the mechanical movement is translated back into an electrical effect for operating the exhibiting or control device. Because of the small power available in the first electrical effect, such devices usually operate on a periodic or step by step principle. That is to say, upon a change in the variable the exhibiting or control device is not continuously operated in correspondence with such change or changes, but periodically by means of a feeler mechanism an exhibiting or control device is changed an amount corresponding to the amount of change in the variable during succeeding increments of time. Such step by step and feeler mechanisms are well known in the art.

It is evident that such devices are necessarily complicated and delicate and do not correctly exhibit the variable during transient periods. Our invention is particularly concerned with the elimination of all mechanical movements between the sensitive device and the exhibiting or control device, leading to simplification and removal of the usual time delay, so that the device accurately exhibits the magnitude of the variable, even during transient periods. It is evident that many ancillary advantages will follow, among which may be mentioned as obvious the elimination of wear of mechanical parts and elimination of the necessity of periodic inspection and adjustment to correct for inaccuracies occasioned by mechanical wear.

One object of the invention is to provide apparatus wherein the manifestations of a resistance or other sensitive device may be utilized in the control of amplified power to start, stop and reverse a motor, as well as to control the speed of a motor when it is operating in selected direction of rotation.

Another object of the invention is to provide for the simultaneous indication of the value of the variable condition with a control of the magnitude of the condition.

A further object of the invention is to provide for control of the speed and direction of rotation of a reversible electric motor wherein no contacts are required in the system.

Still another object is to provide a measuring and/or control system which is continuously and instantaneously responsive to the controlled condition.

A further object is to provide a measuring and/or control system reacting precisely in predetermined manner to minute changes in the magnitude of a variable.

Still another object is to provide apparatus which is simple and rugged in construction, reliable in operation, and subject to a minimum of maintenance requirement.

In accordance with preferred embodiments of our invention a condition responsive device, such as a resistance or impedance value, controls the energization of a control or magnetizing winding of a saturable core reactor to effect corresponding changes in the impedance of the output winding of the reactor, which in turn determines the electric energy made available through an energy utilizing device, such as a motor or the like.

For a more complete understanding of our invention reference should be made to the description which follows and to the drawings in which:

Fig. 1 diagrammatically illustrates our invention in connection with the measurement and control of the rate of flow of a fluid passing through a conduit under pressure.

Figure 2:
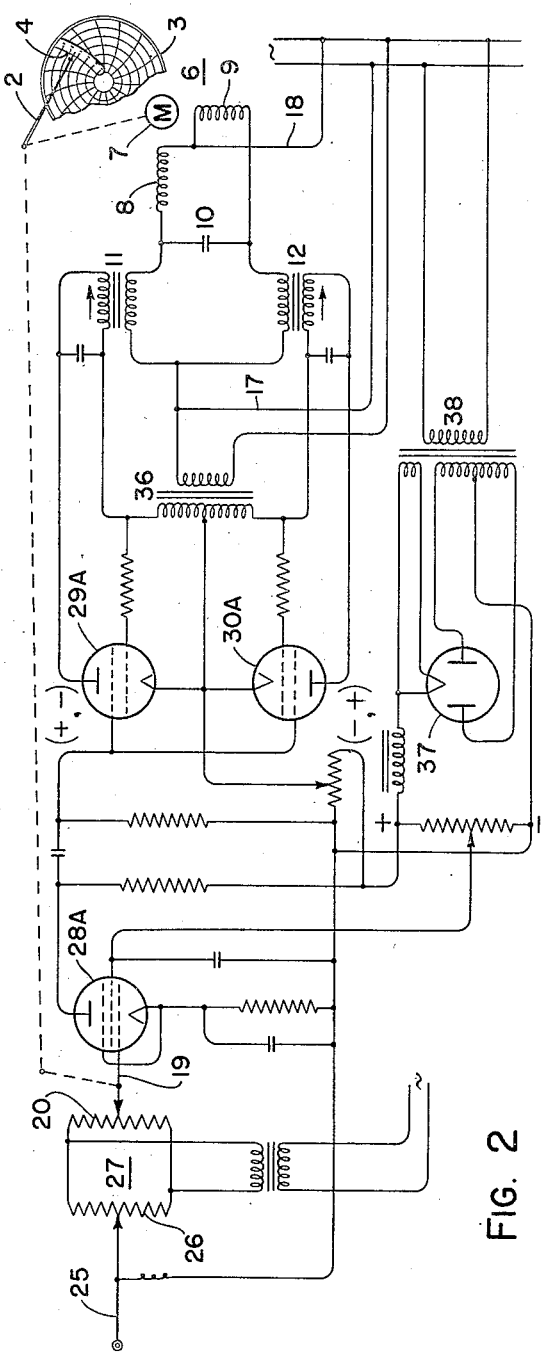

Fig. 2 diagrammatically illustrates the circuit and arrangement of a modification of our invention which is adapted to measure and/or control rate of fluid flow or other variable.

Figure 3:
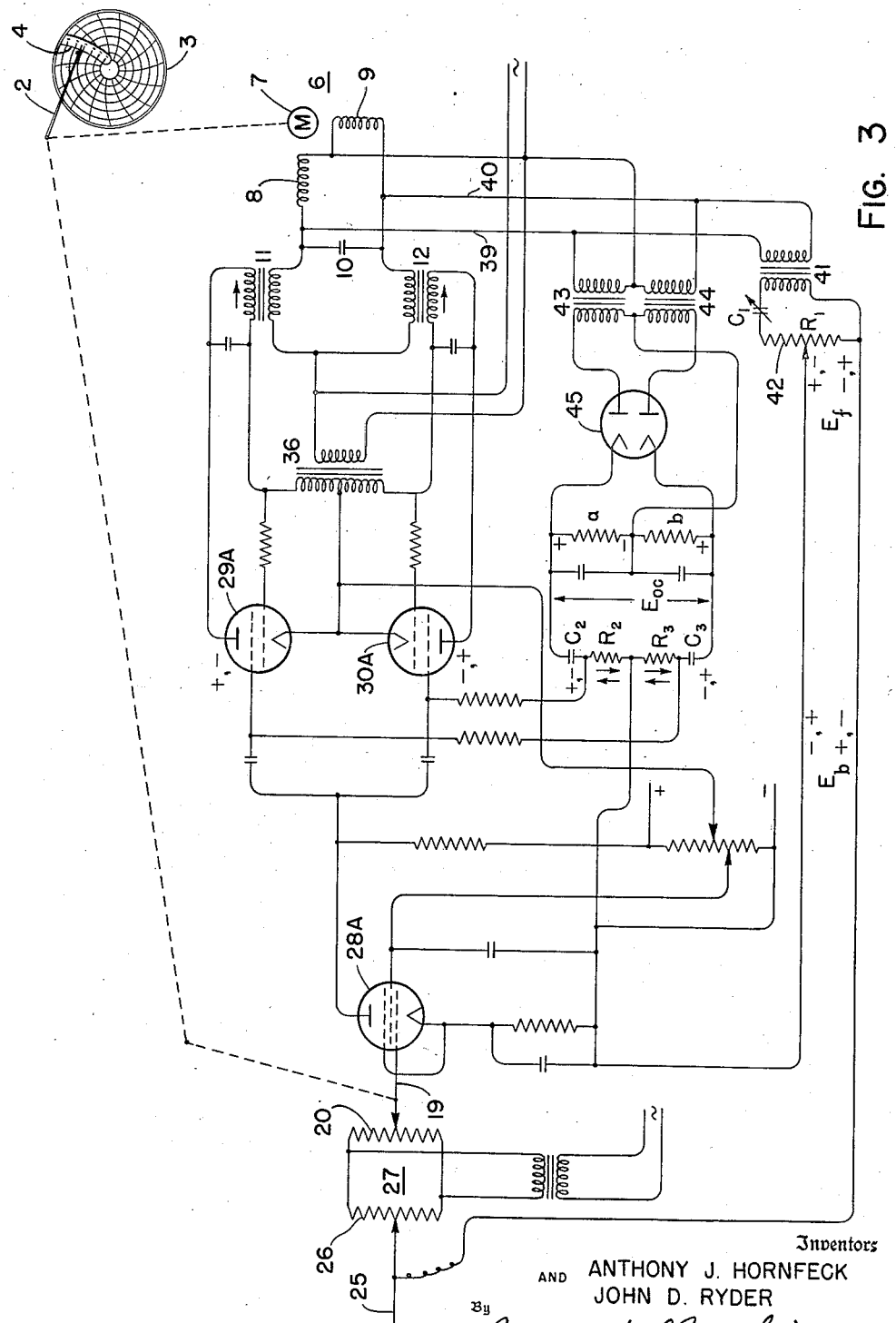

Fig. 3 illustrates a further modification of our invention.

Referring now particularly to Fig. 7 we have therein illustrated our invention arranged to exhibit and to control the rate of flow of a fluid through a conduit 1. The exhibiting means is shown as including a movable index 2 which records the flow rate on a suitably graduated time revoluble chart 3, and further indicates the flow rate by means of a scale 4. The rate of flow of the fluid through the conduit 1 is controlled to a desired standard value by the positioning of a flow regulating valve 5 in the conduit 1.

The index 2 and control valve 5 are simultaneously positioned by a motor 6, which is illustrated as a capacitor-run alternating current motor having a wound rotor 7 and stator windings 8 and 9, the latter constituting running coils electrically ninety degrees apart. The capacitor-run motor is provided with a capacitor or condenser 10, which, when the motor is rotating, is in series with either the winding 8 or the winding 9, depending upon desired direction of rotation. Such a motor runs as a two-phase alternating current motor, and not only may be reversed as to direction of rotation, but is susceptible of speed control when rotating in either direction. A particular object of our invention is to provide an improved circuit arrangement, including saturable core reactors, for controlling the direction and speed of rotation of the motor 6. We have employed our invention in the control and operation of capacitor-run motors up to and including one-half horsepower, but this is by no means to be considered a limitation in the size of a motor which may be controlled in accordance with our invention.

The arrangement in general provides a D.-C. control current for two saturable core reactors 11 and 12. These reactors are connected in the motor circuit in such a way that the direction of rotation depends on which reactor is being saturated and the speed of the motor depends on the degree of saturation of the reactor. The saturable core reactor 11 is provided with a D.-C. saturating winding 13 and an A.-C. output winding 14; while the saturable core reactor 12 is provided with a D.-C. saturating winding 15 and with an A.-C. output winding 16.

The motor circuit loop comprises (as clearly indicated in Fig. 1) the output windings 14, 16, the motor windings 8 and 9, and the capacitor 10. The loop is provided with alternating current energy from a source by way of conductors 17 and 18. Direction and speed of rotation of the motor 6 is determined by the relative saturation of the direct current windings 13 and 15 of the saturable core reactors 11 and 12. The saturating windings, may, in a condition of equilibrium, be unsaturated, partially saturated, or fully saturated. So long as the degree of saturation of the windings 13 and 15 is the same, then the motor control loop is in a steady state or a state of equilibrium or balance, and no rotation of the rotor 7 occurs. Upon unbalance of the degree of saturation of the windings 13, 15, i. e. with either the saturation of the one winding being decreased relative to the other, or with the saturation of the one winding being increased relative to the other, there will result a rotation of the rotor 7 in predetermined direction and at a speed determined by the unbalance of the output of the saturable core reactors which is determined by the difference in degree of saturation of the windings 13 and 15. For example, assume a steady state in which the degree of saturation of the windings 13 and 15 is equal, the energization of the windings 8 and 9 is equal and in phase electrically, and the rotor 7 is not urged to rotation. If the saturation of the winding 13 is increased then alternating current from the source flows over the circuit; conductor 17, output winding 14, motor winding 8, and conductor 18 to the source. At the same time energy passes through the parallel circuit; conductor 17, output winding 14, capacitor 10, motor winding 9, conductor 18 to the source. Thus the motor winding 8 will be connected substantially directly across the source, while motor winding 9 will be connected in series with the capacitor 10 across the source. If the unbalance of saturation is in the opposite direction with the winding 15 predominating, current passage from the alternating current source is such that the winding 9 will be connected substantially directly across the source, while the winding 8 will have connected in series with the capacitor 10 to the source.

When, for example, current flows directly through 8, and by way of the capacitor 10 through 9 at 90 degrees electrical phase angle to winding 8, the motor 6 operates as a two-phase motor in predetermined direction, and when current flows directly through winding 9 and by way of capacitor 10 through winding 8 the motor operates in reverse direction as a two-phase motor. Thus when the motor is rotating, capacitor 10 is always in series with either the winding 8 or with the winding 9 and the motor is termed a capacitor-run motor. The direction of unbalance of the saturating windings 13 and 15 determines the direction of rotation of the motor 6 and the degree of unbalance determines the speed of rotation in that direction.

As previously mentioned, the motor 6 is adapted to position the index 2 as well as the control value 5. The motor is additionally connected to simultaneously position a contact member 19 along a balancing resistor 20, which will be hereinafter referred to. We have shown the driving connections between the motor 6, index 2, valve 5 and contact element 19 schematically, it being evident that such reduction gears or other mechanical devices as may be found necessary may be employed.

We will now describe that portion of the system illustrated in Fig. 1, which is adapted to vary the saturation of the reactors 11 and 12 responsive to rate of flow of the fluid through the conduit 1.

In the conduit 1 is located an orifice or other pressure differential producing device 21 which creates a pressure drop thereacross bearing a known relation to rate of fluid flow therethrough. This pressure differential is applied to a U-tube or manometer 22 containing a sealing liquid such as mercury 23. On the surface of the mercury, in one leg of the U-tube, is a float 24 adapted to position (externally of the U-tube chamber) a contact arm 25 along a resistance 26 forming part of a balanceable electrical bridge network 27 comprising a loop in which the resistance 20 is also included. Upon an unbalance of the bridge 27, as for example by movement of the contact arm 25 along the resistance 26, electric amplifying means (for control of the saturating windings 13 and 15) is actuated, to result in movement of arm 19 and rebalancing of the loop 27.

Connected in circuit with the balanceable bridge 27 is the input circuit of an electron discharge device 28 for controlling the motor control tubes 29, 30. The tubes 29, 30 are preferably arranged in circuit to have opposite polarity, that is the anode of the tube 29 is positive during one half cycle and the anode of the tube 30 is positive during the remaining half cycle. Unbalance of the bridge 27 in one sense will then produce a voltage of the same instantaneous polarity as the anode of the tube 29 (for example) effecting rotation of the motor 6 in one direction. Unbalance of the bridge in opposite direction will produce a voltage having the same instantaneous polarity as the anode of tube 30, and accordingly will effect operation of the motor 6 in opposite direction.

The output circuit of the device 28 is shown as including a source of direct current 31 and a resistance 32. The grid of the device 28 may be biased so that it is non-conducting or it is conducting a predetermined amount. Such direct current as normally flows through the output circuit of the device 28 has no effect upon the potential impressed upon the grids of the tubes 29 and 30 by virtue of a condenser 33. Upon passage of alternating current through the input circuit of the device 28 however, the current in the output circuit of the device becomes pulsating in character which will pass through the condenser 33 and render either the tube 29 or 30 conducting selectively in accordance with the sense of unbalance of the bridge 27.

The tubes 29 and 30 may normally be maintained non-conducting. This is accomplished by connecting the grids through a resistance 34 to a voltage divider 35. To provide a high degree of sensitivity, in some cases it may be preferable to maintain the tubes 29 and 30 normally conducting, in which case the pulsating current originating due to unbalance of the bridge 27 will selectively render one or the other of the tubes more conducting.

When either the tube 29 or the tube 30 is conducting it completes its output circuit through the secondary of a transformer 36 and either the saturating winding 13 or 15. The related winding 13 or 15 thus has impressed upon it a unidirectional pulsating current comprising the half wave of the alternating current which is passed by the related tube 29 or 30. The other saturating winding is adapted to receive (when its tube 29 or 30 is conducting) the other half wave of the alternating current from the transformer 36 as a unidirectional pulsating current. Flow of such pulsating current through the winding 13 or through the winding 15, or through both in varying degree, varies the saturation of the saturable core reactors 11 and/or 12. For example, the tubes 29, 30 may normally both be non-conducting, in which event current is not normally flowing through the windings 13 or 15. If either the tube 29 or 30 is rendered conducting, then unidirectional pulsating direct current will flow through the related winding 13 or 15 and in amount dependent upon the degree of conductance of the tube. If normally both tubes 29 and 30 are conducting and equally so, then if one of the tubes 29 or 30 is rendered more conducting, the related winding 13 or 15 passes more current than under the steady condition of balance, and the resulting unbalance of saturation of the reactors 11 and 12 determines the direction and speed of rotation of the motor 6.

In the embodiment shown in Fig. 1 we preferably arrange the tubes 29 and 30 so that they are of opposite polarity. Thus any component of the current in the output circuit of the device 28 is impressed upon the grids of the tubes 29 and 30 through the condenser 33, which inhibits the passage of direct current. It will, therefore, be solely the component of the current in the output circuit of the device 28 produced by unbalance of the bridge 27, which will be effective for controlling the grid-cathode potential relationship of the tubes 29 and 30. As the tubes 29 and 30 have opposite polarity the particular tube rendered conducting during each half cycle when the proper anode-cathode potential relationship exists will be determined by the polarity of the bridge output circuit. The particular motor winding 8 or 9 with which the capacitor 10 is connected in series upon unbalance of the bridge is selectively determined therefore in dependence upon the direction of unbalance. As heretofore mentioned, operation of the motor 6 serves to position the index 2, as well as the valve 5, and the balancing resistance arm 19 along the resistance 20 to restore the bridge to balance.

In this particular embodiment of Fig. 1 we indicate an arrangement adapted to desirably control the rate of fluid flow through the conduit 1 to maintain a predetermined constant rate of flow. In other words, the circuit arrangement of the bridge 27 is such that the bridge is in balance when the contact arm 25 is at a predetermined position along resistance 26. Obviously this presumes a definite elevation of mercury 23 in the manometer 22 and thereby a definite differential of pressure across the orifice 21 and a corresponding definite rate of fluid flow through the conduit 1.

If, due to variation in demand, or for some other external reason, the rate of flow of fluid through the orifice 21 increases or decreases over the optimum value, the resulting movement of the contact arm 25 along the resistance 26 will cause an unbalance of the bridge 27 in one direction or the other, which will result in an actuation of the motor 6 in predetermined direction whereby the index 2 will be moved to indicate the actual higher or lower rate of fluid through the conduit 1 from the predetermined value to be maintained. Simultaneously the contact arm 19 will be moved in proper direction and amount along the resistance 20 to balance the bridge 27 and stop rotation of the motor 6. At the same time the motor 6 will move the control valve 5 in proper direction to decrease or increase the rate of fluid flow as may be required to bring the actual rate back to the optimum value. Obviously the control as a whole will tend to maintain a uniform preselected rate of fluid flow through the conduit 1 and will record on the chart 3 the actual rate of fluid flow at all times. It is apparent that the system may be arranged so that the motor 6 positions only the index 2 and the balancing resistance contact 19 and does not simultaneously position any regulating valve 5. In such a system the rate of flow of fluid through the conduit 1 is, of course, allowed to deviate at will without interference from the control system and the electrical system will serve only to continuously record upon the chart 3 the position of the index 2, which is representative of the actual differential pressure across the orifice 21. Such a system as we have disclosed provides a telemeter whereby the index 2 with its related chart 3 and indicating scale 4, as well as the motor 6, may be located remotely a considerable distance from the orifice 21.

In Fig. 2 we illustrate a circuit arrangement substantially the same as that of Fig. 1, functioning in the same manner, and having substantially the same characteristics. Whereas in Fig. 1 the tubes 29 and 30 may be of the type 6F6, the tubes 29A and 30A of Fig. 2 may be of the type 6L6. The source of direct current in Fig. 2 is by way of a gas rectifier tube 5Y3G, indicated as element 37 on the drawings, and supplied from the alternating current source through a transformer 38.

In the arrangement of Fig. 2 we have not indicated the motivating force for positioning the contact arm 25 along the resistance 26. Obviously the arm 25 does not need to be positioned responsive to differential pressure or fluid rate of flow as was illustrated in Fig. 1, but may be positioned by and in accordance with any desired variable, quantity, quality, condition, position, etc. For example, it may be positioned in accordance with a temperature value or a pressure value. Furthermore, the arrangement of Fig. 2 may provide a telemeter wherein merely the position of the arm 25 is remotely indicated or recorded by way of the scale 4 or the recording chart 3. Such position might be manually set up on the arm 25, or the arm 25 may follow some position automatically moved or positioned by machine, a gun, a searchlight, or the like. In Fig. 2 no control provisions have been shown, but obviously these may be along the general lines illustrated in Fig. 1 and described in connection therewith.

In Fig. 3 we illustrate the same general arrangement of electric circuit for control of the capacitor-run motor 6 as we have shown in Figs. 1 and 2, but additionally we include a feed-back from the motor windings and capacitor to reduce overtravel and hunting. The conductors 39 and 40 are connected across the motor windings and lead to a transformer 41 connected across a resistor 42. A common terminal of the secondary of the transformer 41 and of the resistor 42 is connected to the contact arm 25. A slideable contact engaging the resistor 42 leads to the tube 28A. A pair of transformers 43 and 44 are respectively connected across the motor windings 8 and 9 and responsive to the current flow therethrough. The output of the transformers 43, 44 is led to a rectifier 45, which feeds the tubes 29A and 30A on a feed-back proportional in direction and amount to the rate of change of voltage across the motor windings.

The A.-C. feed-back through transformer 41 is a portion of the unbalanced bridge voltage of the motor control circuit and is proportional to the speed of the motor. It is connected in series with the input to grid of the amplifying tube 28A. The phase of this feed-back voltage reverses with reversal of motor rotation and acts to oppose the unbalance voltage from bridge 27 at any instant. $C_1$ and $R_1$ are adjusted so that the feed-back $E_f$ is exactly 180° out of phase with the bridge unbalance voltage $E_b$ as shown in Fig. 3 by the + and − signs.

Another feed-back proportional to rate of change of speed is introduced into the grid circuits of tubes 29A and 30A. This feed-back is in such a direction as to neutralize the inertia of the motor rotor; thus making the motor start and stop in a shorter interval of time, thereby eliminating overtravel and hunting. To explain the operation, assume that the motor is increasing speed in a clockwise direction produced by an increase in excitation of reactor 11 caused in turn by an increase in conduction of tube 29A. Under this condition the voltage across winding 8 becomes greater than that across winding 9. This causes a greater voltage to appear across the secondary of transformer 43. Since the secondary voltage across 43 and 44 is rectified by tube 45, the D.-C. voltage across (a), proportional to the voltage across 8, will become greater than the D.-C. voltage across (b), proportional to the voltage across 9. During the time that the change occurs current will flow through the condenser resistance circuit $R_{2-3}$—$C_{2-3}$ and, produce a positive voltage drop across $R_2$ and a negative voltage drop across $R_3$ relative to the grids of tubes 29A and 30A. This will increase the conduction of tube 29A and decrease that of 30A, thereby still further hastening the change in motor speed. If the motor is coming to a stop from the clockwise direction the feed-back voltage will reverse polarity and stop the motor more rapidly.

In general, we provide an improved arrangement and electric circuit which is in total self-balancing. Preferably we arrange the circuit to control a capacitor-run alternating current motor for reversal of direction of rotation and for speed control. It will be appreciated that the drawings and description are illustrative only, and not necessarily limiting in respect to our invention in its broad aspects.

What we claim as new, and desire to secure by Letters Patent of the United States is:

1. A balanceable electric network including a resistance bridge, means responsive to a variable disturbing the balance upon change in magnitude and producing an alternating current potential across points of the bridge of variable phase or polarity relative to a source of alternating current in accordance with the sense of change in the magnitude, balancing means in said bridge for nullifying said potential, a capacitor-run alternating current motor mechanically connected to actuate said balancing means, said motor comprising two field windings and a capacitor connected in a closed circuit, one terminal of a source of supply being permanently connected to the junction of the two windings and means for alternatively associating the other terminal with the opposite end of either winding and its junction with the capacitor, said means comprising a pair of saturable core reactors each having a winding connected between said other terminal and one of said opposite ends of the motor windings and each having a saturating winding, a pair of electron discharge devices of variable anode current capacity each having its anode energized continuously at a low value through one of said saturating windings from a source of alternating current, means responsive to the phase or polarity of said potential to render one or the other of said devices more conductive and the remaining one less conductive whereby one saturating winding saturates its core more and the other one less and the motor is actuated in a corresponding direction and at a speed dependent upon the differential of the saturations to balance the network, each of said devices having a control electrode, means normally biasing said electrodes equally, and means providing a feedback potential from the motor fields to change said biasing to increase the differential of current flow to the anodes of said devices when the motor is operating.

2. A balanceable electric network including a resistance bridge, means responsive to a variable disturbing the balance upon change in magnitude and producing an alternating current potential across points of the bridge of variable phase or polarity relative to a source of alternating current in accordance with the sense of change in the magnitude, balancing means in said bridge for nullifying said potential, a capacitor-run alternating current motor mechanically connected to actuate said balancing means, said motor comprising two field windings and a capacitor connected in a closed circuit, one terminal of a source of supply being permanently connected to the junction of the two windings and means for alternatively associating the other terminal with the opposite end of either winding and its junction with the capacitor, said means comprising a pair of saturable core reactors each having a winding connected between said other terminal and one of said opposite ends of the motor windings and each having a saturating winding, a pair of electron discharge devices of variable anode current capacity each having its anode energized continuously at a low value through one of said saturating windings from a source of alternating current, means responsive to the phase or polarity of said potential to render one or the other of said devices more conductive and the remaining one less conductive whereby one saturating winding saturates its core more and the other one less and the motor is actuated in a corresponding direction and at a speed dependent upon the differential of the saturations to balance the network, each of said devices having a control electrode, means normally biasing said electrodes equally, means providing a feedback potential from the motor fields to change said biasing to increase the differential of current flow to the anodes of said devices when the motor is operating, and means energized from the motor fields to partially oppose the change in said bridge potential to prevent overrun of the motor.

3. A control system including in combination, means sensitive to the value of a variable quantity, quality or condition to be controlled, a balanceable bridge network arranged to become unbalanced upon change in said value, a capacitor-run alternating current motor having two windings and a capacitor, rotation of said motor occurring in selected direction when current flow is directly through one of said windings and simultaneously through the other of said windings in series with the capacitor, a pair of saturable core reactors each having an output winding connected in circuit with said motor windings and each having a saturating control winding, the relative impedance of said output windings determining the direction of rotation of said motor, normally balanced electron tube means sensitive to unbalance of said network connected to regulate the current flow in said saturating windings for obtaining desired directional rotation of the motor, means positioned by said motor upon the network becoming unbalanced for rebalancing the network, and means responsive to the potential across each motor winding to regulate the bias of the tube controlling the saturating winding of the reactor for the other motor winding.

4. Apparatus comprising means responsive to the magnitude of a variable for establishing an A. C. potential of variable phase relative to a source of A. C. in accordance with the sense of change in said magnitude, a pair of thermionic motor control tubes having their anodes energized by A. C., input circuits for said tubes so connected to said A. C. potential of variable phase that one or the other of said tubes is selectively rendered more conducting in accordance with the phase of said potential, a capacitor-run A. C. motor having two field windings and a capacitor so arranged in circuit that depending upon which tube is rendered more conducting one of the field windings is directly energized while the other field winding is energized through said capacitor, a balancing means for nullifying said potential positioned by said motor, circuit means providing rectified feedback potentials from the motor field windings, said potentials being proportional to rate of change of motor speed, and means to introduce said last mentioned potentials into the input circuits of the motor control tubes in such a direction as to substantially neutralize the inertia of the motor rotor.

5. Apparatus comprising means responsive to the magnitude of a variable for establishing an A. C. potential of variable phase relative to a source of A. C. in accordance with the sense of change in said magnitude, a pair of thermionic motor control tubes having their anodes energized by A. C., input circuits for said tubes so connected to said A. C. potential of variable phase that one or the other of said tubes is selectively rendered more conducting in accordance with the phase of said potential, a capacitor-run A. C. motor having two field windings and a capacitor so arranged in circuit that depending upon which tube is rendered more conducting one of the field windings is directly energized while the other field winding is energized through said capacitor, a balancing means for nullifying said potential positioned by said motor, circuit means providing rectified feedback potentials from the motor field windings, said potentials being proportional to rate of change of motor speed, means to introduce said last mentioned potentials into the input circuits of the motor control tubes in such a direction as to substantially neutralize the inertia of the motor rotor, circuit means establishing an A. C. feedback potential proportional to the speed of the motor, and a circuit for combining the said A. C. feedback potential in opposition to the A. C. potential of variable phase.

6. A balanceable electric network including a resistance bridge, means responsive to a variable disturbing the balance upon change in magnitude and producing an A. C. potential across the bridge of variable phase relative to a source of A. C. in accordance with the sense of change in the magnitude, balancing means in said bridge for nullifying said potential, a capacitor-run alternating current motor mechanically connected to actuate said balancing means, said motor comprising two field windings and a capacitor connected in a closed circuit, one terminal of a source of A. C. supply being permanently connected to the junction of the two windings and means for differentially associating the other terminal with the opposite ends of the windings and their junction with the capacitor, said means comprising a pair of electron discharge devices of variable anode current capacity each having its anode energized continuously at a low value through one of said field windings from said source of A. C., means responsive to the phase of said potential to render one or the other of said devices more conductive whereby the motor is actuated in a corresponding direction and at speed dependent upon the differential to balance the network, each of said devices having a control electrode, means normally biasing said electrodes equally, means providing a feedback potential from the motor fields to change said biasing to increase the differential of current flow to the anodes of said devices when the motor is operating, and means energized from the motor fields to partially oppose the change in said bridge potential to prevent over-run of the motor.

7. Apparatus comprising means responsive to the magnitude of a variable for establishing an alternating current potential of variable phase or polarity relative to a source of alternating current in accordance with the sense of change in said magnitude, an electron discharge device for amplifying the magnitude of said potential, a pair of vacuum type motor control tubes adjusted for partial conduction, input circuits for said tubes so connected to said device that one or the other of said tubes is selectively rendered more conducting in accordance with the phase or polarity of the potential, a pair of saturable core reactors each having a saturating winding and an alternating current output winding, each of said tubes individually controlling the degree of saturation of one of said reactors, a capacitor-run alternating current motor having two field windings and a capacitor so arranged in circuit that depending upon which reactor saturating winding predominates as to saturation one of the field windings is directly in circuit through the related reactor output winding to the source of alternating current while the other field winding and capacitor are in series in circuit through the same reactor output winding to the source of alternating current, electric circuit means providing a feedback from motor field winding current to the input of the motor control tubes whereby the effect of one of the tubes is amplified while that of the other tube is diminished, and a balancing means for nullifying said potential positioned by said motor.

JOHN D. RYDER.
ANTHONY J. HORNFECK.